United States Patent
Kirisawa

[11] Patent Number: 6,034,999
[45] Date of Patent: Mar. 7, 2000

[54] BURST SIGNAL TRANSMITTER CAPABLE OF PRODUCING CORRECT TRANSMISSION OUTPUT IN INITIAL BURST SIGNAL

[75] Inventor: Akihiro Kirisawa, Tokyo, Japan

[73] Assignee: NEC Corporation, Tokyo, Japan

[21] Appl. No.: 08/951,101

[22] Filed: Oct. 15, 1997

[30] Foreign Application Priority Data

Oct. 16, 1996 [JP] Japan ..................... 8-272772

[51] Int. Cl.[7] .................................. H04L 27/04
[52] U.S. Cl. ................... 375/295; 375/312; 455/126
[58] Field of Search ................... 375/295, 297, 375/298, 308, 309, 311, 312; 330/127, 129, 279; 465/126, 127, 117, 91; 332/149, 154

[56] References Cited

U.S. PATENT DOCUMENTS

| | | | |
|---|---|---|---|
| 5,179,353 | 1/1993 | Miyake | 330/129 |
| 5,193,223 | 3/1993 | Walczek et al. | 455/126 |
| 5,204,637 | 4/1993 | Trinh | 330/129 |
| 5,369,789 | 11/1994 | Kosugi et al. | 455/126 |
| 5,381,115 | 1/1995 | Timmons et al. | 330/279 |
| 5,530,923 | 6/1996 | Heinonen et al. | 455/126 |
| 5,548,826 | 8/1996 | Sayers | 455/126 |
| 5,640,691 | 6/1997 | Davis et al. | 455/126 |
| 5,852,778 | 9/1998 | Kasamatsu | 455/126 |

FOREIGN PATENT DOCUMENTS 6-216785  8/1994  Japan.

*Primary Examiner*—Chi H. Pham
*Assistant Examiner*—Bayard Emmanuel
*Attorney, Agent, or Firm*—Young & Thompson

[57] ABSTRACT

In a burst signal transmitting apparatus for power-amplifying a burst signal to transmit the power-amplified burst signal, a correct transmission output can be obtained even in an initial burst signal after a power supply is turned ON. In this burst signal transmitting apparatus, a signal supply to a transmission antenna is blocked by a switch for a predetermined time period after the power supply is turned ON, but this signal is supplied to a dummy. During this time period, the initial burst signal is produced, and an automatic level control is carried out for this initial burst signal by way of an automatic level control loop constituted by a detector, an LPF, a differential amplifier, a reference voltage source, and a variable attenuator. Accordingly, the transmission level is converged to become constant. Thereafter, the burst signal is supplied to the transmission antenna by the switch, so that the operation is entered into the normal operation.

11 Claims, 9 Drawing Sheets

BURST SIGNAL TRANSMITTER CAPABLE OF PRODUCING CORRECT TRANSMISSION OUTPUT IN INITIAL BURST SIGNAL

BACKGROUND OF THE INVENTION

The present invention generally relates to a burst signal transmitter. More specifically, the present invention is directed to a burst signal transmitting apparatus having a function for automatically controlling a transmission output level, namely, ALC (Automatic Level Control) of a transmitting apparatus of a modulated burst signal used in mobile communication apparatuses and portable type satellite communication apparatuses.

DESCRIPTION OF THE RELATED ART

As an example of this sort of conventional burst signal transmitting apparatus, Japanese Laid-open Patent Application No. 6-216785 discloses "TRANSMITTER CIRCUIT OF WIRELESS TELEPHONE". In the method for controlling the transmission output level of the burst signal in this conventional transmitter circuit, a portion of the power output from the power amplifier is sampled at the timing close to the end of the burst signal. Then, in response to this sampling level, the attenuation amount of the variable attenuator provided at the prestage of this power amplifier is controlled.

FIG. 1 is a block diagram for representing this conventional transmitter circuit. Referring to FIG. 1, this transmitter circuit corresponds to the transmitter circuit of the wireless telephone capable of performing the time division multiplex (TDM) type signal communication. The modulator 1 produces the transmission signal constituted by the PSK (Phase Shift Keying) signal which has been roll-off-shaped in the burst mode under control of the central processing unit(CPU) 10.

The burst transmission signal outputted from this modulator 1 is inputted via the variable attenuator 2 into the power amplifier 3. This burst transmission signal power-amplified in this power amplifier 3 is supplied via the directional coupling device (coupler) 4 to the transmission antenna 5.

A portion of the amplified signal outputted from the power amplifier 5 is derived via the directional coupling device 4, and then detected by the detector 7, and thereafter smoothed by the low-pass filter 12. It should be noted that the low-pass filter 12 averages the output levels of the detector 7, and the time constant of this low-pass filter 12 is selected to be such a time constant sufficiently capable of averaging the burst transmission signals outputted from the power amplifier 3.

The output signal from this low-pass filter 12 is applied to the positive input terminal of the differential amplifier 8, and this signal is compared with the reference level 13 applied to the negative input terminal thereof by this differential amplifier 8. The difference voltage obtained from this comparison is analog-to-digital(A/D)-converted into the digital signal by the A/D converter 9. Then, this digital signal is supplied to the CPU 10.

In this CPU 10, this digital difference voltage signal is sampled at the timing near the end of the burst signal, so that the averaged output per 1 burst is calculated. Based on this averaged output, the attenuation amount (ATT amount) of the attenuator 2 is controlled.

The above-described conventional burst signal transmitting apparatus owns the following four problems.

As the first problem, the output level for the first burst signal after the power supply is turned ON cannot be fixedly determined. The reason is such that the output level is made unstable until the burst signal transmission is accomplished, since the sampling operation is carried out near the end of the burst signal.

As the second problem, unnecessary radiation will occur, and also the burst signal reception by the counter party's station will fail. The reason is given as follows. As to the first burst signal (initial burst signal), since the attenuation control amount of the variable attenuator is excessively reduced, the power amplifier is saturated, whereas since the attenuation control amount of the variable attenuator is excessively increased, the output level is excessively lowered.

As the third problem, several burst signals are required until the level of the burst signal can become the proper level. The reason is such that a lengthy time is required until the control operation is ended, since the sampling operation is carried out only while the bust signal is transmitted.

As the fourth problem, the transmission output level can be hardly varied. The reason is given as follows: That is, even when the control operation is performed in such a manner that the reference voltage is changed so as to vary the transmission output level, after the several burst signals have been transmitted, this transmission output level may become the desirable output level. Accordingly, when the output levels different from each other are required every burst signal, such a control operation cannot be practically utilized.

An object of the present invention is to provide a burst signal transmitting apparatus capable of producing a correct transmission output even in the first burst (initial burst) signal after the power supply is turned ON.

SUMMARY OF THE INVENTION

To achieve the above-described object, a burst signal transmitting apparatus, according to the present invention, is featured as follows: In a burst signal transmitting apparatus including amplifying means for amplifying a burst signal and a transmission antenna for transmitting an amplified burst signal of this amplifying means, and for automatically controlling a level of this amplified burst signal to a constant level, this burst signal transmitting apparatus is comprised of: blocking means for blocking a supply of the amplified burst signal to the transmission antenna; and control means for causing the blocking means to be operated for a predetermined time period after a power supply is turned ON so as to block the supply of the amplified burst signal to the transmission antenna, and also for controlling the level of this amplified burst signal to be set to a constant level.

In accordance with the burst signal transmitting apparatus of the present invention, when a first burst signal is transmitted after the power supply is turned ON, a reset signal is sent from a reset circuit to a central processing unit(CPU), and then this CPU is brought into the initializing operation. At this time, the signal output of the power amplifier is terminated not at an antenna, but at a dummy, so that the electromagnetic waves are not transmitted. Under this condition, the data is transmitted from a modulator, and a variable attenuator is controlled based on a voltage produced by detecting a portion of the signal output from the power amplifier. As a result, a gain of this power amplifier is set to a proper value, so that the burst signals having the properly selected levels can be transmitted under stable conditions since the first burst signal has been transmitted.

BRIEF DESCRIPTION OF THE DRAWINGS

A more complete understanding of the teachings of the present invention may be acquired by referring to the accompanying figures, in which like reference numbers indicate like features and wherein:

FIGS. 4A to 4E indicate a timing chart of signals appearing at various circuit portions of the burst signal transmitting apparatus according to the first embodiment after the power supply is turned ON;

FIG. 5 is a flow chart for describing operation of the burst signal transmitting apparatus shown in FIG. 2 after the power supply is turned ON;

DETAILED DESCRIPTION OF THE PREFERRED EMBODIMENTS

Referring now to drawings, various preferred embodiments of the present invention will be described.

Figure 1:
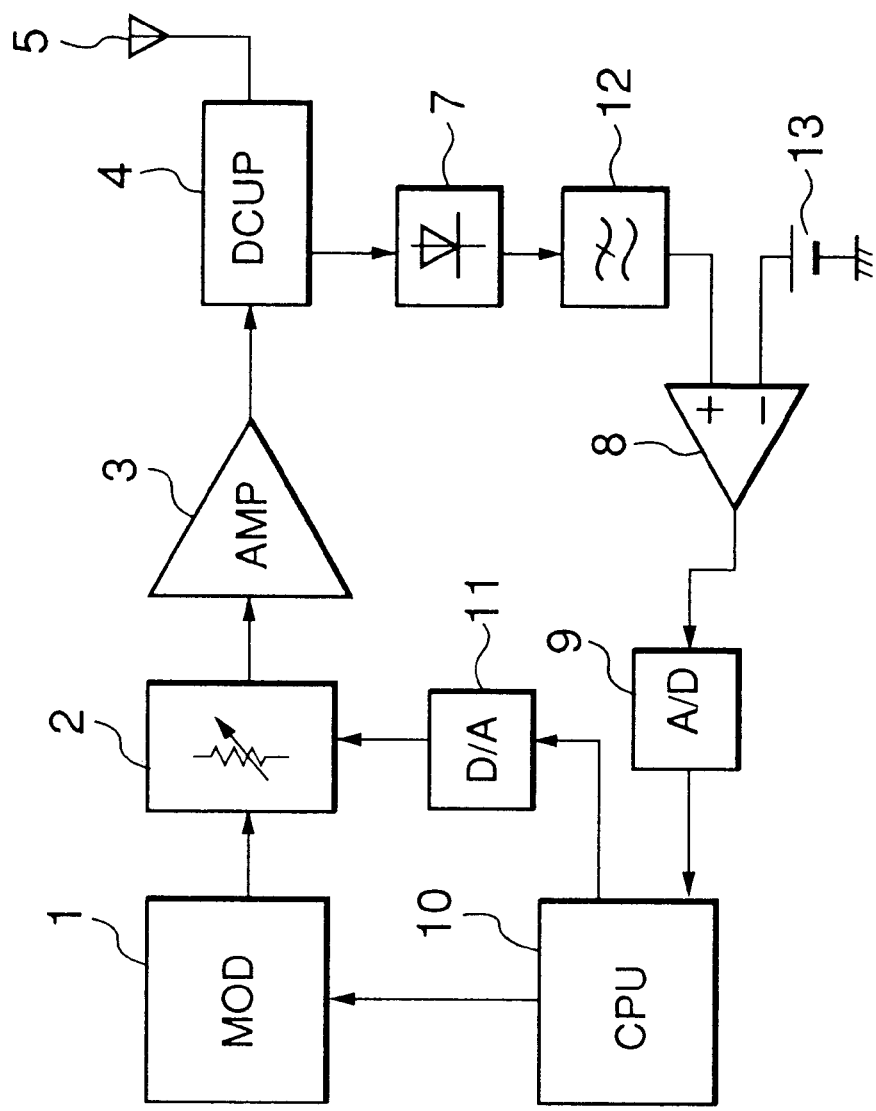
FIG. 1 is a schematic block diagram for showing the arrangement of the conventional burst signal transmitting apparatus.
Figure 2:
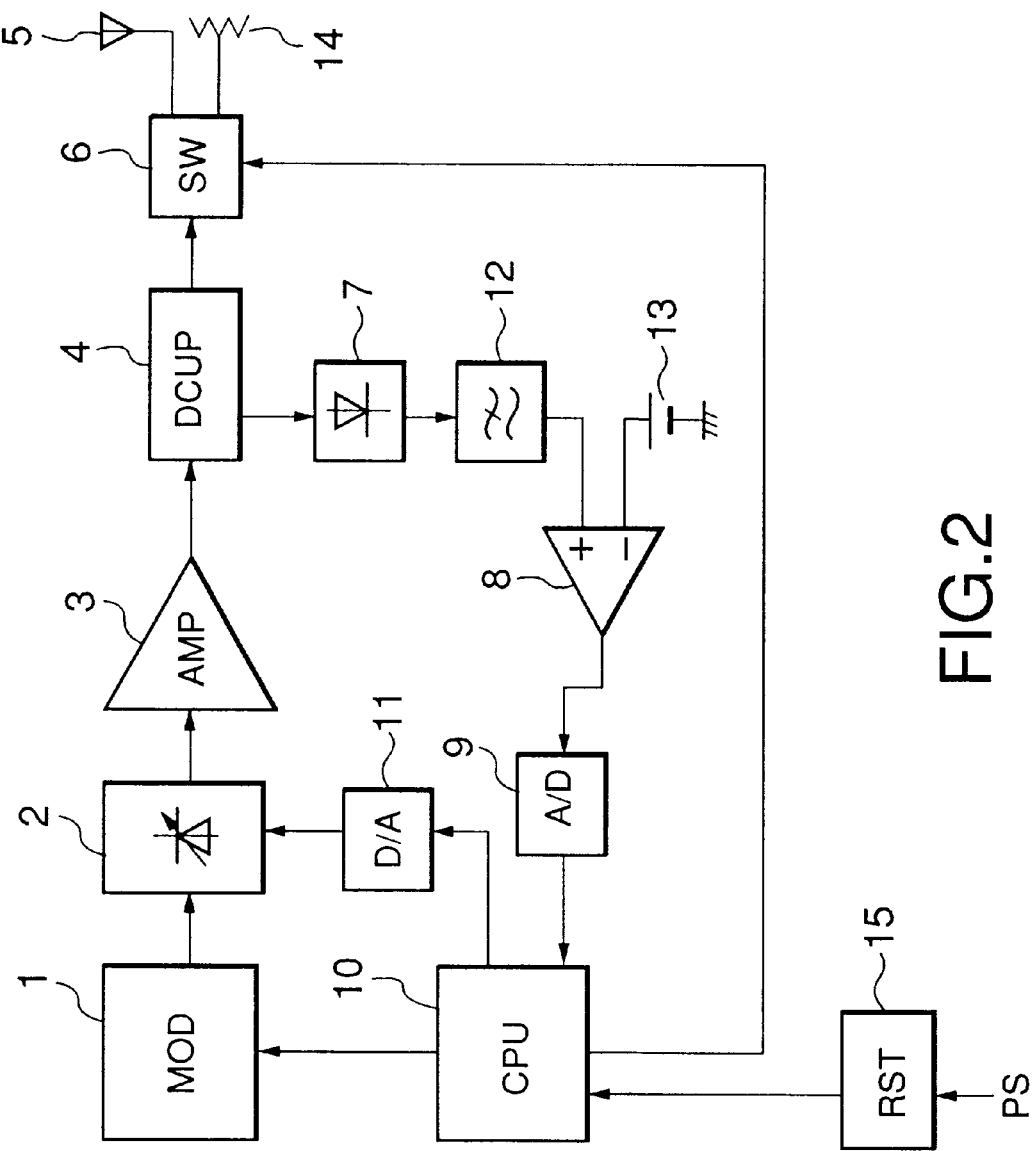
FIG. 2 is a schematic block diagram for representing an arrangement of a burst signal transmitting apparatus according to a first embodiment of the present invention.

FIG. 2 schematically shows an entire circuit block diagram of a burst signal transmitting apparatus, or a burst signal transmitter, according to a first embodiment of the present invention. Referring to FIG. 2, a modulator 1 produces a digital modulation signal (e.g., phase modulation signal) as a transmission signal in a burst mode under control of a central processing unit(CPU) 10. This digital modulation signal is supplied via a variable attenuator 2 to a high power amplifier 3 so as to be power-amplified. Then, this high power-amplified transmission signal is outputted through a directional coupling device 4 and an RF (radio frequency) switch 6 from an antenna 5.

A portion of the transmission signal outputted from the high power amplifier 3 is derived from the directional coupling device 4, and then is detected by a detector 7. After the detected transmission signal is smoothed (filtered) by a low-pass filter 12, the smoothed transmission signal is entered into a differential amplifier 8. Also, a reference voltage is applied from a reference voltage supply 13 to this differential amplifier 8, and the portion of the above-described transmission signal is outputted from the low-pass filter 12 to this differential amplifier 8. A voltage compared with an average level of a burst signal is differentially amplified in the differential amplifier 8. The differentially-amplified voltage is A/D-converted into a digital signal in an analog-to-digital(A/D) converter 9, and thereafter this digital signal is supplied to the central processing unit 10.

The central processing unit 10 is connected to a digital-to-to-analog(D/A) converter 11 in order to supply control data to this D/A converter 11. Also, this central processing unit 10 is connected to the modulator 1 in order to control the burst operation, and furthermore is connected to the RF switch 6 so as to send a switching control signal of this RF switch 6.

A reset circuit 15 is employed so as to send a reset signal having a low level to the central processing unit 10 when the power supply is turned ON. The output of the D/A converter 11 is connected to the variable attenuator 2. As this variable attenuator 2, the following attenuators may be used, e.g., an attenuator constructed of a PIN diode and the like, and another attenuator capable of controlling a gate voltage of an FET (field-effect transistor).

Also, the RF switch 6 is arranged by an RF relay, or a diode switch and an FET switch. This RF switch 6 owns a function capable of switching the output from the high power amplifier 3 to the antenna 5 and a terminating device 14.

A description will now be made of operations of the first burst signal transmitting apparatus indicated in FIG. 2. In FIG. 2, the modulation signal (for example, QPSK= quadrature phase shift keying modulation signal) having a desirable frequency is outputted from the modulator 1. This modulation signal is ON/OFF-controlled every time a specific interval (several milliseconds to several seconds) has passed in synchronism with a TDM(Time Division Multiplex) type transmission frame under control of the central processing unit 10, so that this modulation signal is sent as a burst transmission signal in a burst mode.

Then, this burst transmission signal is inputted via the variable attenuator 2 to the high power amplifier 3. A portion of this burst transmission signal is derived by the directional coupling device 4, and then is detected by the detector 7 in such a manner that an output level of the high power amplifier 3, namely an output level (i.e., transmission level) to be transmitted from the antenna 5 becomes a voltage of several hundreds mV which will then be outputted. It should be noted that the transmission level is directly proportional to the detected voltage value.

The detected voltage is smoothed by the low-pass filter 12. Since the amplitudes of the modulation signal such as the QPSK modulation signal are not constant, these amplitudes must be averaged in order to obtain an average output voltage. Therefore, the low-pass filter 12 is used. To this purpose, the time constant of this low-pass filter 12 must be selected to be sufficiently larger than the modulation speed, and also must be selected in order that the overall system (namely, overall control loop) can be operated under stable condition. It is preferable to select this time constant approximately 10 times higher than the modulation speed.

The output from this low-pass filter 12 is compared with the reference voltage 13 in the difference amplifier 8. The reference voltage is set to be such a voltage equal to the detection voltage at the desirable transmission output level. The differential amplifier 8 outputs the difference voltage between the detected voltage and the reference voltage 13. This difference voltage is A/D-converted into the digital signal by the A/D converter 9.

The central processing unit 10 performs a process operation for acquiring the difference voltage between the output level of the detector 7 and the level of the reference voltage source 13, a process operation for determining the attenuation amount of the variable attenuator, and a process operation for determining the timing of the burst signal.

Figure 3:
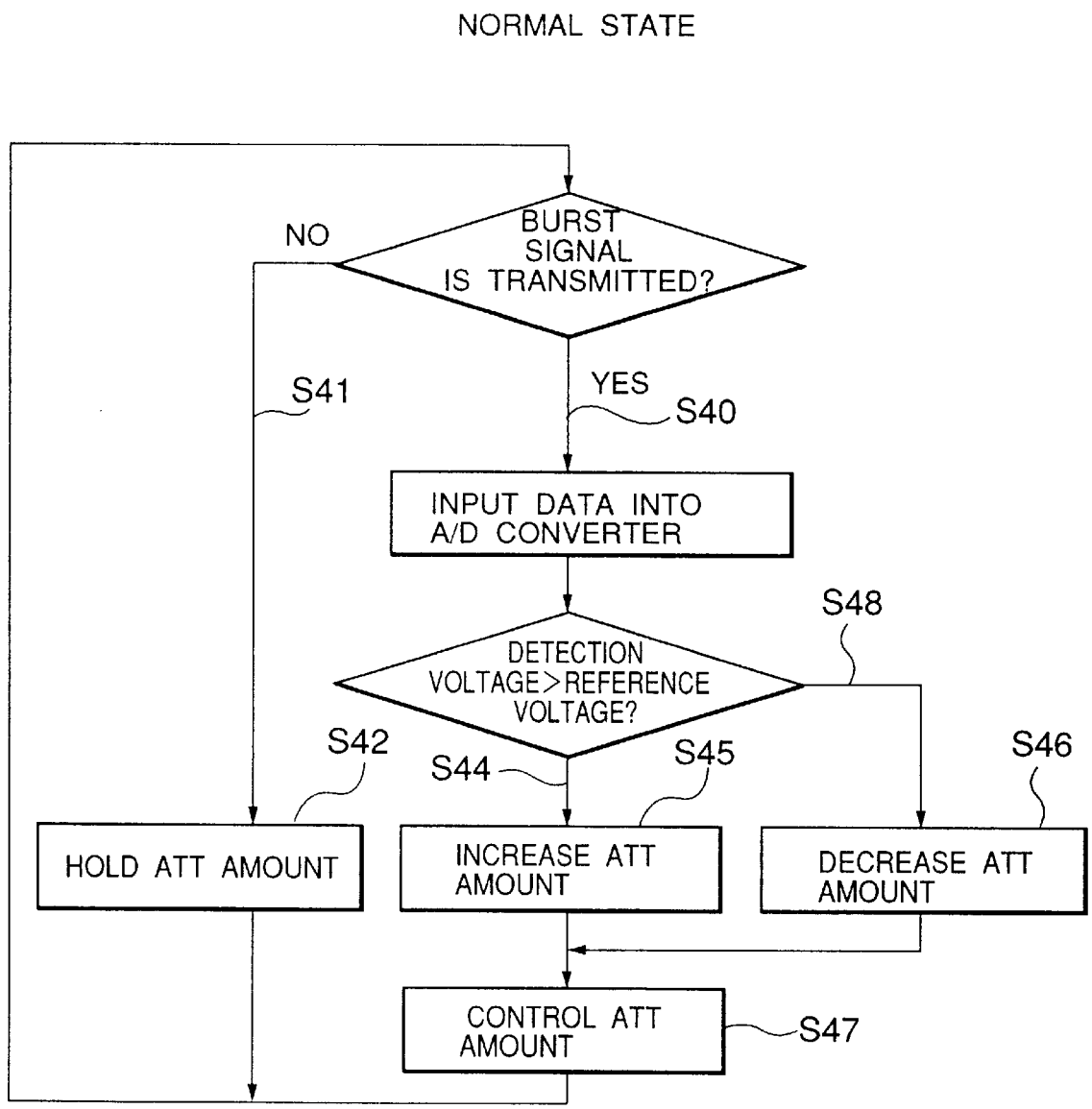
FIG. 3 is a flow chart for describing normal process operation of the burst signal transmitting apparatus shown in FIG. 2.

Next, operation of the central processing unit 10 will now be explained. First, CPU operation under normal state is described in a flow chart of FIG. 3. The CPU operations under normal state are different from each other, depending on such a fact that the burst signal is being transmitted, or not being transmitted. In the case that the burst signal is not being transmitted (step S41), since the first burst signal transmitting apparatus is operated under such a condition that no signal is inputted into the high power amplifier 3, no detection voltage is outputted. At this time, since the setting value (namely, attenuation amount "ATT amount") of the variable attenuator acquired at preceding time under which the burst signal was being transmitted is maintained (step S42), the attenuation amount of the variable attenuator 2 also maintains such a condition that the burst signal was being transmitted.

In the case that the burst signal is transmitted (step S40), the CPU 10 acquires the digital data of the A/D converter 9 (step S43). When the detection voltage is higher than the reference voltage (S44), the attenuation amount data (ATT amount) saved (stored) in the CPU 10 is increased by this acquired data (step S45). Conversely, when the detection voltage is lower than the reference voltage (step S48), the attenuation amount data saved in this CPU 10 is decreased (step S46). Next, this data is outputted to the D/A converter 11, and thus the variable attenuator 2 is controlled based on this data (step S47).

While the burst signal is transmitted, this operation is repeatedly performed, so that the transmission output level (namely, output level of signal transmitted from antenna 5) becomes constant.

Assuming now that the burst transmission frame is selected to be on the order of several tens of milliseconds, a series of the above-explained operation is carried out within a time period of approximately several milliseconds, during which the data from the A/D converter 9 is acquired, and the acquired data is outputted to the D/A converter 11.

Then, operation of the first burst signal transmitting apparatus when the power supply is turned ON will now be explained with reference to a time chart of FIGS. 4A to 4E and a flow chart of FIG. 5. Under normal state, the control amount of the variable attenuator 2 is very small, and the control amount at the initial stage becomes unstable when the power supply is turned ON. At this time, in order to roughly define the control amount, the following operation is carried out.

The reset signal shown in FIG. 4A becomes a low level during a certain time period "T1" when the power supply is turned ON by a reset circuit 15, and then this reset signal is notified to the CPU 10. During this time period "T1", after the CPU 10 has executed the initial setting operation of the software (step S31), the CPU 20 switches the RF switch 6 to the dummy side (14 side) (step S32). Then, the transmission data is brought into ON state (TX ON) to transmit the data (step S33). At this time, since the output of the high power amplifier 3 is connected not to the antenna 5, but to the terminating device 14 (dummy) (during constant time period "T2"), this output is not sent out. It should be noted that since this constant time period "T2" may be selected to such a time period that the transmission level can be converged to a constant level by an ALC operation (will be explained later), the time period "T2" is normally selected to be on the other of 1 burst time period.

Figure 6:
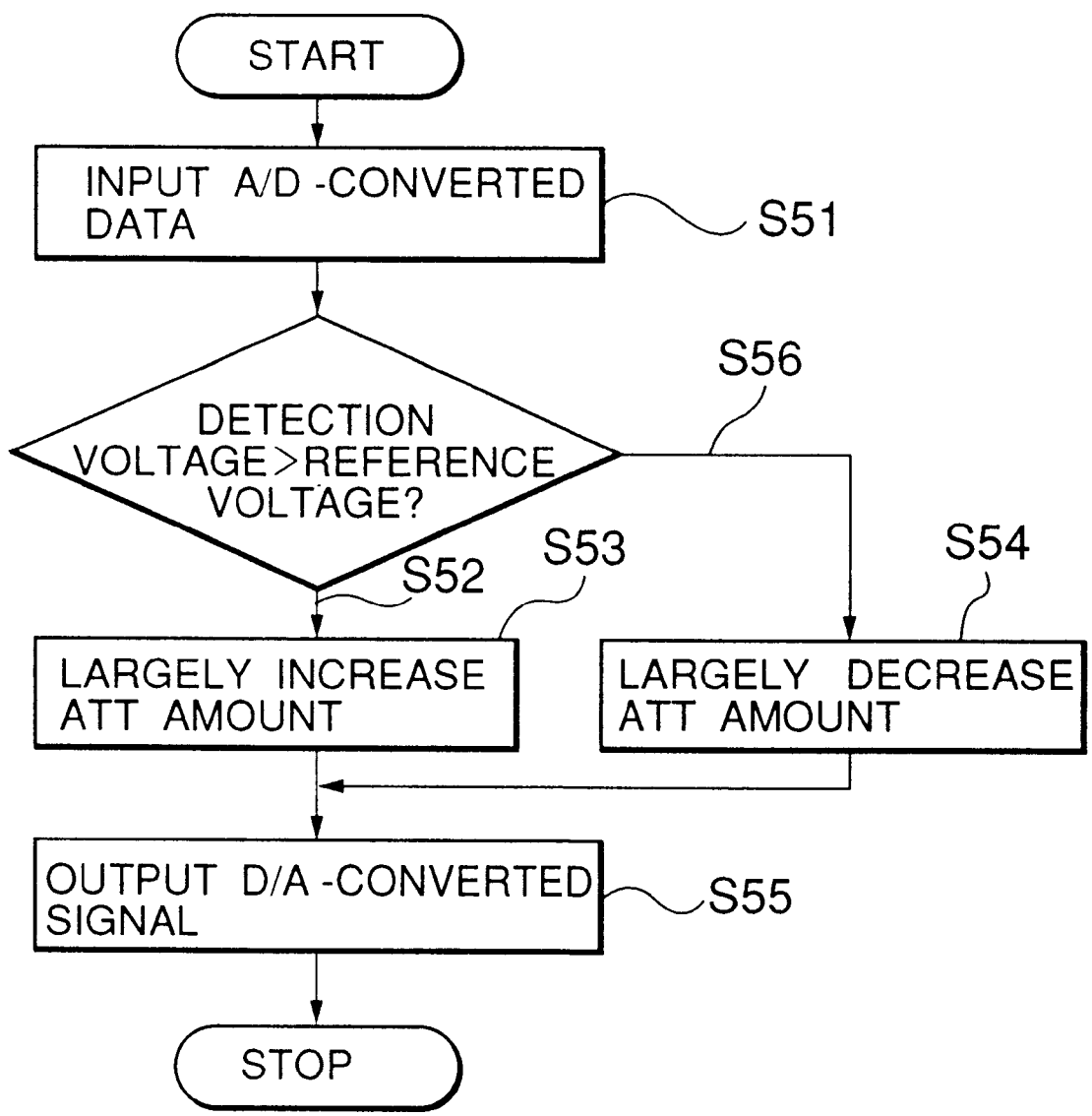
FIG. 6 is a flow chart for describing detailed operation of the ALC operation defined at the step S34 of the flow chart of FIG. 5.

Next, the operation of the first burst signal transmitting apparatus is advanced to the ALC(Automatic Level Control) operation (step S34). This ALC operation is indicated in the flow chart of FIG. 6. The digital data is acquired from the A/D converter 9 (step S51) to compare the detection voltage with the reference voltage. When the detection voltage is higher than the reference voltage (step S52), the attenuation amount(ATT amount) of the variable attenuator 2 is largely increased (step S53). Conversely, when the detection voltage is lower than the reference voltage (step S56), the attenuation amount(ATT amount) of the variable attenuator 2 is largely decreased (step S54).

It should also be noted in this specification that the expressions "ATT amount is largely increased", and "ATT amount is largely decreased" imply such control amounts approximately 10 times larger than the control amount under normal state (namely, burst signal is normally transmitted, and transmission level becomes substantially constant (i.e., control condition of FIG. 3)).

As a consequence, the time required to converge the transmission level into a constant level can be shortened. This ALC operation is carried out during constant time "T2" (step S35 of flow chart in FIG. 5), so that the transmission level can be converged into the constant level. Thereafter, the TX data is brought into OFF state (step S36), and the control signal of the RF switch 6 is switched from the dummy side (terminal side) to the antenna side (step S37). Thereafter, the ALC operation is advanced to the normal operation.

With execution of the above-described operation, since the output level is determined even when the first burst signal is sent out after the power supply is turned ON, the burst signal with the correct level can be transmitted.

Now, a concrete example of the circuit shown in FIG. 2 will be described. The modulator 1 produces the digital modulation signal of 8 Kbps by the QPSK modulation system as the burst transmission signal with the time period of 40 ms under control of the CPU 10. This burst signal is sent via the variable attenuator 2 arranged by the PIN attenuator to the high power amplifier 3 so as to be power-amplified. The power-amplified burst signal is transmitted via the directional coupling device 4 and the RF switch 6 from the antenna 5.

The signal component of "−20 dB" in the transmission signal outputted from the power amplifier 3 is derived from the directional coupling device 4, and then is detected by the detector 7. The detected signal is smoothed by the low-pass filter 12, and thereafter the smoothed signal is inputted into the differential amplifier 8.

Also, the reference voltage of 100 mV from the reference voltage supply 13 is applied to the differential amplifier 8 which differentially amplifies the voltage compared with the average level of the burst signals outputted from the low-pass filter 12. Then, the differentially-amplified signal is supplied to the 8-bit A/D converter 9 so as to be converted into the 8-bit digital signal which will then be sent to the CPU 10.

The CPU 10 is connected so as to send the control data to the 8-bit D/A converter 11, and also is connected to the modulator 1 in order to control the burst operation and further to send the switching control signal to the RF switch 6.

Next, the output of the D/A converter 11 is connected to the variable attenuator 2, and the reset circuit 15 is connected to the CPU 10 in order to send out the low-level signal when the power supply is turned ON. This variable attenuator 2 is arranged by the PIN diode. Also, the RF switch 6 is an SPDT (Single Pole Double Throw) switch using an RF relay, and owns the function for switching the output from the high power amplifier 3 to the antenna 5 and the terminating device 14.

Next, the operation of the first burst signal transmitting apparatus will now be explained more in detail. From the modulator 1, the QPSK modulation signal of 8 Kbps is outputted in the frequency band of 1.6 GHz. This modulation signal is ON/OFF-controlled every 40 ms in synchronism with a TDM(Time Division Multiplex) type transmission frame of 40 ms under control of the central processing unit 10, so that this modulation signal is sent as the burst transmission signal in the burst mode.

Then, this burst transmission signal is inputted via the variable attenuator 2 to the high power amplifier 3 so as to be amplified up to 1 W. Then, the amplified burst signal is attenuated by 20 dB by the directional coupling device 4 having the coupling degree of 20 dB, and the attenuated burst signal is detected by the diode detector 7, so that such a voltage is outputted which is directly proportional to the output level (transmission level) of the signal which should be transmitted from the antenna. When the output level is 1 W, the voltage of 100 mV is outputted.

The detected voltage is smoothed by the low-pass filter 12. Since the amplitudes of the modulation signal such as the QPSK modulation signal are not constant, these amplitudes must be averaged in order to obtain an average output voltage. At this time, the time constant of this low-pass filter 12 must be selected to be sufficiently larger than the modulation speed, and also must be selected in order that the overall system (namely, overall control loop) can be operated under stable condition. It is preferable to select this time constant approximately 10 times higher than the modulation speed. In this case, since the modulation speed is selected to be 8 Kbps, the cut-off frequency of the low-pass filter 12 is set to 800 Hz (10 times in time constant=1/10 times in cutoff frequency). The output of this low-pass filter 12 is compared with the reference voltage 13 to be entered into the differential amplifier 8.

The reference voltage is set to the detection voltage of 100 mV when the transmission output level is equal to 1 W. The differential amplifier 8 outputs the difference voltage between the detected voltage and the reference voltage 13. This difference voltage is A/D-converted into the digital signal by the 8-bit A/D converter 9.

The central processing unit 10 performs the process operation for acquiring the difference voltage of the difference voltage to the detector 7, a process operation for determining the attenuation amount of the variable attenuator, and a process operation for determining the timing of the burst signal.

Next, operation of the central processing unit 10 will now be explained. The CPU operation under normal state is described in the flow chart of FIG. 3. The CPU operations under normal state are different from each other, depending on such a fact that the burst signal is being transmitted, or not being transmitted. In the case that the burst signal is not being transmitted, since the first burst signal transmitting apparatus is operated under such a condition that no signal is inputted into the high power amplifier 3, no detection voltage is outputted. At this time, since the setting value of the variable attenuator acquired at the time under which the burst signal was being transmitted is maintained, the attenuation amount of the variable attenuator also maintains such a condition that the burst signal was being transmitted in the preceding time.

In the case that the burst signal is transmitted, the CPU 10 acquires and judges the digital data of the 8 bit A/D converter 9. When the detection voltage is higher than the reference voltage even by 1 bit, the attenuation amount data (ATT amount) saved (stored) in the CPU 10 is increased. Conversely, when the detection voltage is lower than the reference voltage even by 1 bit, the attenuation amount data saved in this CPU 10 is decreased. Next, this data is outputted to the D/A converter 11, and thus the variable attenuator 2 is controlled based on this data.

While the burst signal is transmitted, a series of this operation is repeatedly performed, so that the transmission output level (namely, output level of signal transmitted from antenna 5) becomes constant. In this operation, the data of this A/D converter 9 is acquired in a time period of 1 millisecond, and then is outputted to the D/A converter 11.

Then, operation of the first burst signal transmitting apparatus when the power supply is turned ON will now be explained with reference to the time chart of FIG. 4 and the flow chart of FIG. 5. Under normal state, the control amount of the variable attenuator 2 is very small with being controlled in the steps of 0.1 to 0.2 dB, and the control amount at the initial stage becomes unstable when the power supply is turned ON. At this time, in order to roughly define the control amount, the following operation is carried out.

Figure 4:
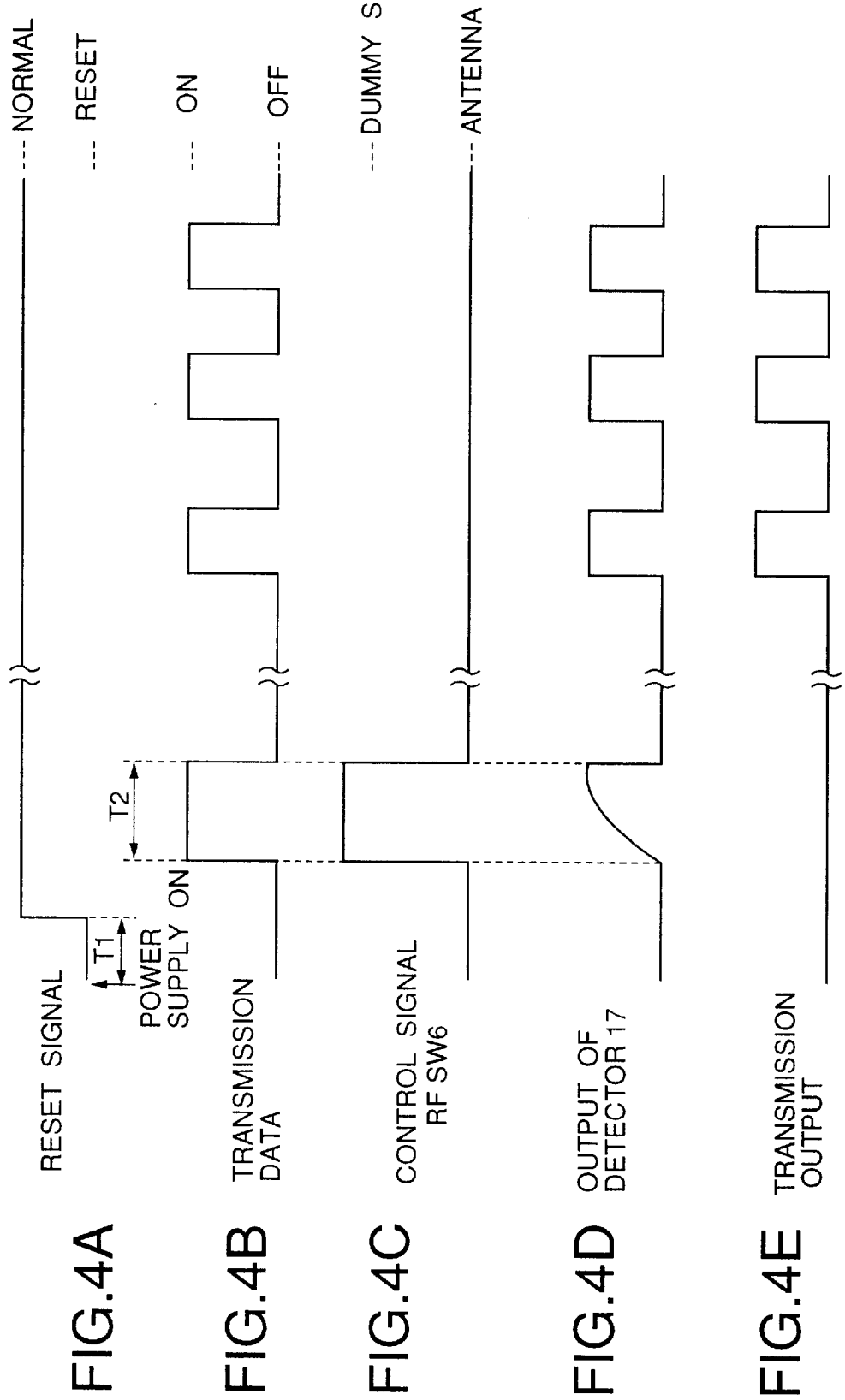
Figure 5:
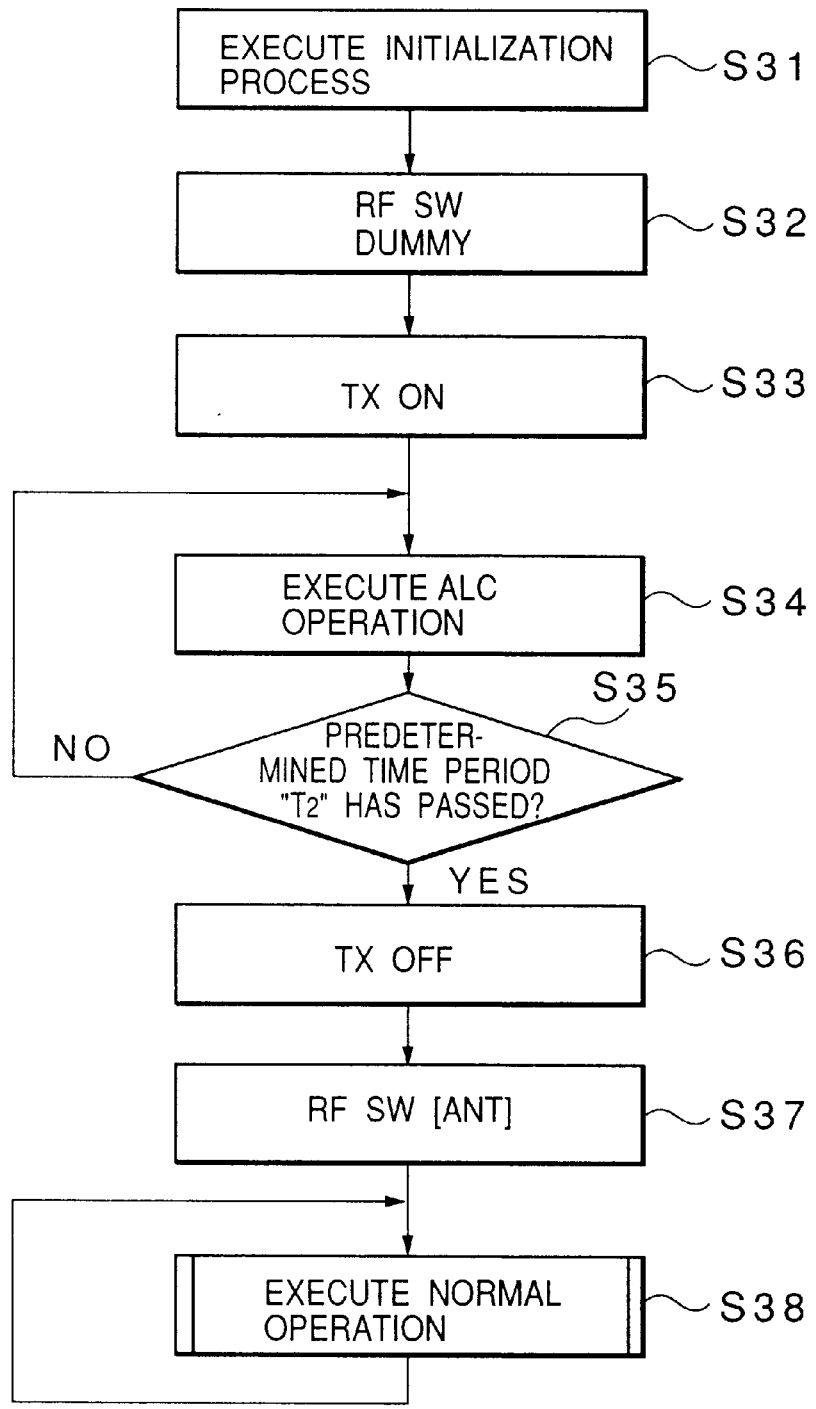

The low-leveled reset signal shown in FIG. 4(*a*) is produced by the reset circuit 15, and then this reset signal is notified to the CPU 10. During this time period "T1", after the CPU 10 has executed the initial setting operation of the software, the CPU 20 switches the RF switch 6 to the dummy side (terminal side). Then, the transmission data is brought into ON state (TX ON) to transmit the data. At this time, since the output of the high power amplifier 3 is connected not to the antenna 5, but to the terminating device 14 (dummy), this output is not sent out.

Next, the operation of the first burst signal transmitting apparatus is advanced to the ALC(Automatic Level Control) operation. This ALC operation is indicated in the flow chart of FIG. 6. The digital data is acquired from the A/D converter 9 to compare the detection voltage with the reference voltage. When the detection voltage is higher than the reference voltage, the attenuation amount(ATT amount) of the variable attenuator is increased by a step of 2 dB. Conversely, when the detection voltage is lower than the reference voltage, the attenuation amount(ATT amount) of the variable attenuator is decreased by a step of 2 dB. In this case, since the attenuation amount is largely varied, as compared with that for the normal state, the time required to converge the transmission level to a constant value can be shortened.

Thereafter, the TX data is brought into OFF state, and the control signal of the RF switch 6 is switched from the dummy side (terminal side) to the antenna side. Thereafter, the ALC operation is advanced to the normal operation.

With execution of the above-described operation, since the output level is determined even when the first burst signal is sent out after the power supply is turned ON, the burst signal with the correct level can be transmitted.

Figure 7:
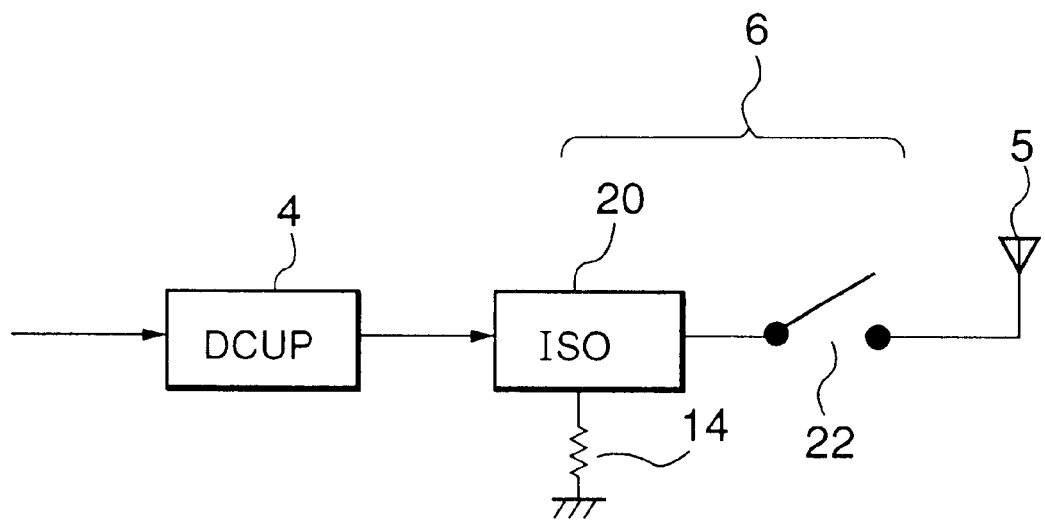
FIG. 7 represents a circuit portion of a burst signal transmitting apparatus according to a second embodiment of the present invention.

FIG. 7 shows a partial circuit arrangement of a burst signal transmitting apparatus according to a second embodiment of the present invention. That is, a portion of the block diagram of the first embodiment indicated in FIG. 2 is replaced, namely the RF switch 6 of SPDT is replaced by an isolator 20 and an ON/OFF switch 22. As a result, the burst signal output can be interrupted only by bringing the antenna 5 to the open state.

At this time, since the total reflection occurs at the ON/OFF switch 22, the power is consumed in the dummy 14 of the isolator 20. Accordingly, the SPDT switch is no longer required.

Figure 8:
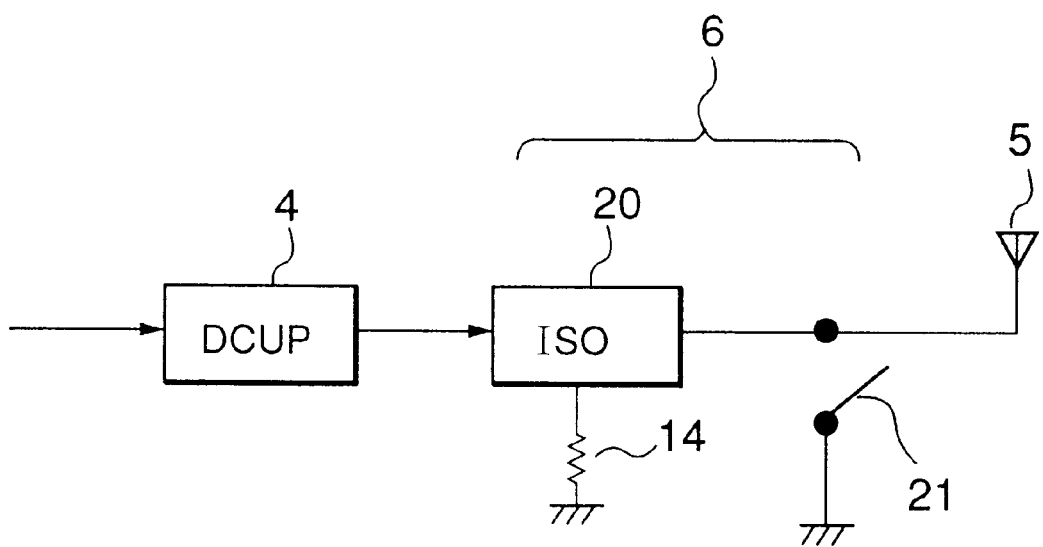
FIG. 8 shows a circuit portion of a burst signal transmitting apparatus according to a third embodiment of the present invention.

FIG. 8 indicates a partial circuit arrangement of a burst signal transmitting apparatus according to a third embodiment of the present invention, and corresponds to a modification of the second embodiment. In this third embodiment, when the antenna output is interrupted, a switch 21 is shortcircuited. At this time, similar to the second embodiment, since the total reflection occurs at this switch 21, the power is consumed at the dummy 14 of the isolator.

Figure 9:
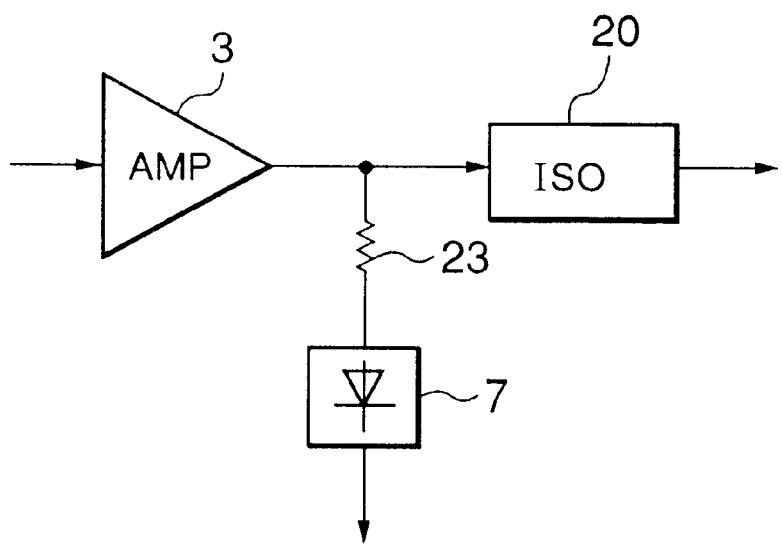
FIG. 9 indicates a circuit portion of a burst signal transmitting apparatus according to a fourth embodiment of the present invention.

FIG. 9 indicates a partial circuit arrangement of a burst signal transmitting apparatus according to a fourth embodiment of the present invention, namely, the directional coupling device 4 of FIG. 4 is replaced by a resistor 23. Even when the antenna condition is changed by inserting the isolator 20 into the output, a constant detection voltage can be derived from the output of the detector 7. Alternatively, this circuit arrangement may be commonly combined with those of FIG. 7 and FIG. 8. In this alternative case, the isolator may be commonly used.

Figure 10:
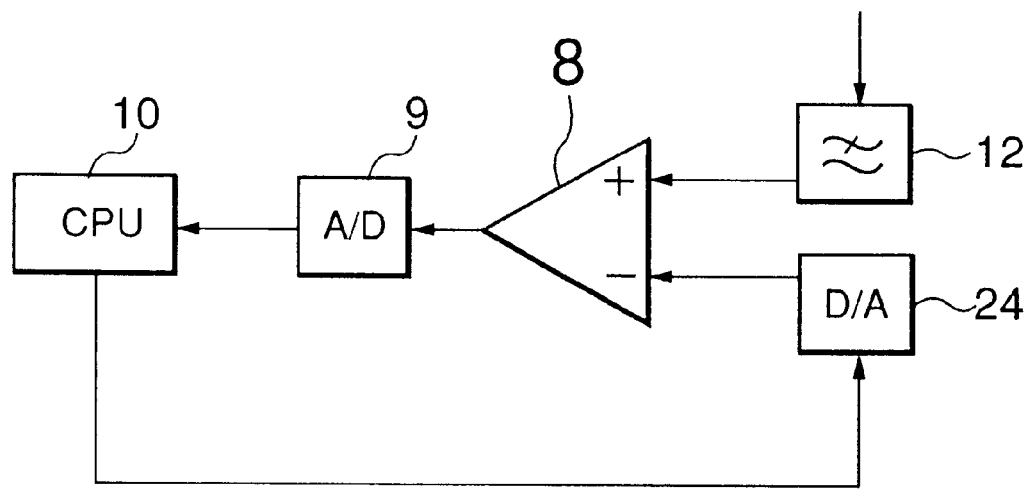
FIG. 10 shows a circuit portion of a burst signal transmitting apparatus according to a fifth embodiment of the present invention.

FIG. 10 indicates a partial circuit arrangement of a burst signal transmitting apparatus according to a fifth embodiment of the present invention, namely, the reference voltage source 13 of FIG. 2 is replaced by a digital-to-analog converter 24. Since an output voltage of the D/A converter is varied by the central processing unit 10, the output voltage namely the reference voltage can be freely set.

Figure 11:
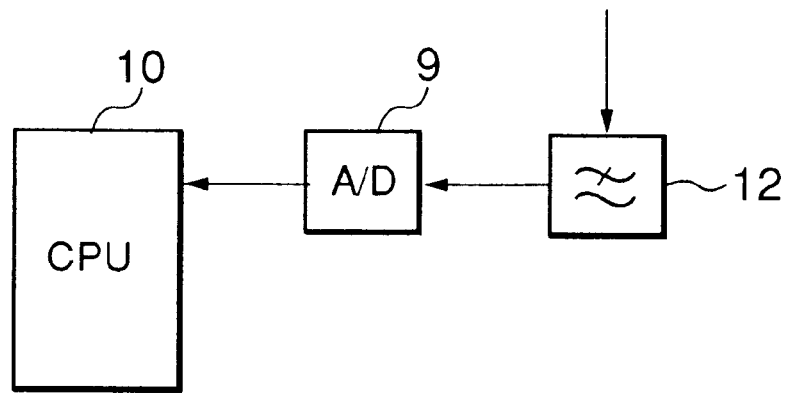
FIG. 11 represents a circuit portion of a burst signal transmitting apparatus according to a sixth embodiment of the present invention.

FIG. 11 is a partial circuit arrangement of a burst signal transmitting apparatus according to a sixth embodiment of the present invention. In other words, this partial circuit arrangement is made by omitting both the operational amplifier 8 and the reference voltage supply 13 from the circuit arrangement of FIG. 2. The voltage derived from the A/D converter 9 is compared with the numeral value (digital value) saved in the CPU 10 in view of the software manner, so that a similar effect to that of the first embodiment can be achieved.

Figure 12:
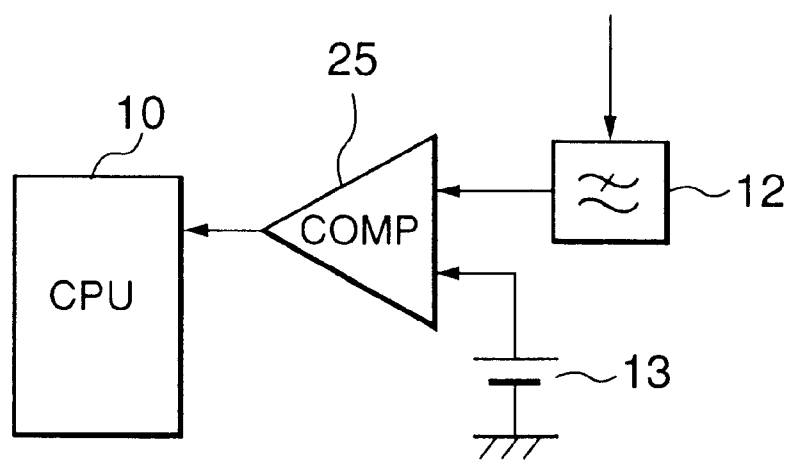
FIG. 12 indicates a circuit portion of a burst signal transmitting apparatus according to a seventh embodiment of the present invention.

FIG. 12 indicates a partial circuit arrangement of a burst signal transmitting apparatus according to a seventh embodiment of the present invention, namely, the operational amplifier 8 and the A/D converter 9 of FIG. 2 are replaced by a comparator 25. As a consequence, although the CPU 10 cannot grasp how many amounts of the detection voltage and the reference voltage are produced, this CPU 10 can judge whether or not the detection voltage is higher than the reference voltage, so that a circular control can be realized. As a result, the circuit arrangement of FIG. 12 can be simplified.

While the burst signal transmitting apparatus of the present invention has been described in detail, there are the following effects.

As a first effect, the output level can be correctly outputted as to the first burst signal produced after the power supply is turned ON. This is because the circuit capable of converging the output level of the burst signal after the power supply is turned ON, and also the control means for the CPU are employed.

As a second effect, unnecessary radiation is not produced, but also there is no chance that the burst signal cannot be received by the counter party's station. This is because the first burst signal can also have the proper output level of the power amplifier.

As a third effect, the output level can be readily varied. This is because even when the reference voltage is varied so as to control the transmission output level to be changed, the first burst signal can be outputted with having the disable output level.

What is claimed is:

1. A burst signal transmitter comprising:
    ALC (automatic level control) means for controlling a level of a burst modulation signal to become constant;
    supplying means for supplying an output of said ALC means to an antenna;
    blocking means for blocking the operation of said supplying means for blocking the output supply to the antenna at a place between an output of the ALC means and the antenna for a predetermined time period after a power supply of said ALC means is turned ON; and
    control means for controlling said ALC means and said blocking means.

2. A burst signal transmitter as claimed in claim 1 wherein:
    said blocking means includes switching means for causing said output of the ALC means to be connected to any one of said antenna and a terminating device for said constant time period.

3. A burst signal transmitter as claimed in claim 2 wherein:
    said switching means includes a SPDT(single pole double throw) type RF(radio frequency) switch.

4. A burst signal transmitter as claimed in claim 1 wherein:
    said blocking means includes an isolator connected to the output of said ALC means during the blocking operation thereof; and a switch for opening a signal appearing between said isolator and said antenna.

5. A burst signal transmitter as claimed in claim 1 wherein:
    said blocking means includes an isolator connected to the output of said ALC means during the blocking operation thereof; and a switch for connecting a signal appearing between said isolator and said antenna to a ground.

6. A burst signal transmitter as claimed in claim 1 wherein:
    said control means produces a burst signal for said predetermined time period, and automatically converges a level of said burst signal so as to becomes constant.

7. A burst signal transmitter as claimed in claim 6 wherein:
    said control means is further comprised of:
        detecting means for detecting the output level of said ALC means;
        comparing means for comparing an output of said detecting means with a predetermined reference level; and
        input level control means for controlling an input level of said ALC means in response to an output from said comparing means.

8. A burst signal transmitter as claimed in claim 7 wherein:
    said input level control means employs a variable attenuator, the attenuation amount of which is variable in response to the output from said comparing means.

9. A burst signal transmitter as claimed in claim 6 wherein:

said control means increases a control step for said ALC control operation for a predetermined time period after the power supply is turned ON, as compared with that for the normal state.

10. A burst signal transmitter as claimed in claim 1 wherein:

said predetermined time period is substantially equal to a 1 burst time period.

11. A burst signal transmitter as claimed in claim 1 wherein:

said control means further stops the blocking operation by said blocking means after a predetermined time period has passed; commences the supply of said ALC output to said antenna; and then controls the blocking operation to be advanced to the normal operation.

* * * * *